United States Patent
Li et al.

(10) Patent No.: US 12,149,507 B2
(45) Date of Patent: Nov. 19, 2024

(54) PROXY NETWORK WITH SELF-ERASING PROCESSING ELEMENTS

(71) Applicant: TELEFONAKTIEBOLAGET LM ERICSSON (PUBL), Stockholm (SE)

(72) Inventors: Qiang Li, Täby (SE); Hans Thorsen, Stockholm (SE); Martin Ryan, Solna (SE); Ola Dahlqvist, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 927 days.

(21) Appl. No.: 16/972,175

(22) PCT Filed: Jun. 26, 2018

(86) PCT No.: PCT/EP2018/067055
§ 371 (c)(1),
(2) Date: Dec. 4, 2020

(87) PCT Pub. No.: WO2020/001743
PCT Pub. Date: Jan. 2, 2020

(65) Prior Publication Data
US 2021/0234836 A1    Jul. 29, 2021

(51) Int. Cl.
*H04L 9/40* (2022.01)
*H04L 12/46* (2006.01)

(52) U.S. Cl.
CPC ...... *H04L 63/0281* (2013.01); *H04L 12/4633* (2013.01); *H04L 63/0272* (2013.01); *H04L 63/0421* (2013.01)

(58) Field of Classification Search
CPC ............. H04L 63/0281; H04L 63/0272; H04L 63/0421; H04L 12/4633
See application file for complete search history.

(56) References Cited

U.S. PATENT DOCUMENTS 6,567,917 B1 * 5/2003 Ziese ...................... G06F 21/64
380/279
9,177,157 B2 * 11/2015 Binder .................. G06F 21/602
(Continued)

FOREIGN PATENT DOCUMENTS

CA    3003084 A1    4/2016
WO   2011100744 A2    8/2011

OTHER PUBLICATIONS

Mortier et al., "Using Dust Clouds to Enhance Anonymous Communication", Springer International Publishing, Jan. 2014, pp. 54-59 (Year: 2014).*

(Continued)

*Primary Examiner* — Linglan Edwards
(74) *Attorney, Agent, or Firm* — Murphy, Bilak & Homiller, PLLC

(57) ABSTRACT

Systems and methods are provided for maintaining data privacy in a communication system. The method includes: providing a proxy network which creates a plurality of ingress processing elements and a plurality of egress processing elements, wherein the ingress processing elements and the egress processing elements each include at least a private processing unit and a private memory area; receiving a request at a selected ingress processing element from a first server; routing the request from the selected ingress processing element to a selected egress processing element; forwarding the request from the selected egress processing element to a second server; and erasing both the selected ingress processing element and the selected egress processing element.

24 Claims, 9 Drawing Sheets

(56) References Cited

U.S. PATENT DOCUMENTS

| | | | | |
|---|---|---|---|---|
| 9,231,919 | B2* | 1/2016 | Rieger | H04L 63/18 |
| 9,998,368 | B2* | 6/2018 | Chen | H04L 45/50 |
| 10,469,574 | B1* | 11/2019 | Dai | H04L 67/1095 |
| 10,547,543 | B2* | 1/2020 | Chen | H04L 45/50 |
| 10,686,625 | B2* | 6/2020 | Cidon | H04L 63/20 |
| 2012/0166582 | A1* | 6/2012 | Binder | G06F 21/602 709/217 |
| 2015/0033347 | A1* | 1/2015 | Sulaiman | H04L 63/0421 726/25 |
| 2015/0067819 | A1* | 3/2015 | Shribman | H04L 67/59 709/218 |
| 2015/0381487 | A1 | 12/2015 | Broz et al. | |
| 2016/0205518 | A1 | 7/2016 | Patel et al. | |
| 2017/0012942 | A1* | 1/2017 | Wittenschlaeger | H04L 63/0281 |
| 2017/0163658 | A1 | 6/2017 | Pike et al. | |
| 2019/0235906 | A1* | 8/2019 | Asawa | G06F 11/3433 |
| 2019/0238443 | A1* | 8/2019 | Di Pietro | H04L 41/0853 |

OTHER PUBLICATIONS

International Search Report/Written Opinion dated Feb. 11, 2019 in related/corresponding PCT Application No. PCT/EP2018/067055.

Jelle Van Den Hooff et al., "Vuvuzela: Scalable Private Messaging Resistant to Traffic Analysis," SOSP'15, Oct. 4-7, 2015, pp. 137-152, Monterey, California, USA., ACM 978-1-4503-3834-Sep. 15, 2010, http://dx.doi.org/10.1145/2815400.2815417.

Malte Schwarzkopf et al., "Using Dust Clouds to Enhance Anonymous Communication (Transcript of Discussion)," Serious Games, Cham, Springer International Publishing, Jan. 2014, 6 pages, vol. 7061.

Examination Report dated Mar. 4, 2024 in related/corresponding European Patent Application No. 18737180.2.

Malte Schwarzkopf, "Using Dust Clouds to Enhance Anonymous Communication (Transcript of Discussion)," University of Cambridge, Serious Games, Cham, Springer International Publishing, Jan. 1, 2014, pp. 60-70, vol. 7061.

\* cited by examiner

PROXY NETWORK WITH SELF-ERASING PROCESSING ELEMENTS

TECHNICAL FIELD

The present invention generally relates to operations within communication networks and, more particularly, to maintaining data and user privacy during communications.

BACKGROUND

Various telecommunication networks are in existence to provide service to end users, to include both personal use and business use. In some cases, telecommunication operator networks provide some services to individuals and enterprise networks provide services to employees of the enterprise. Additionally, data can be transferred between servers and other telecommunication and/or enterprise devices and nodes. At times, the data may contain personal data or other sensitive data for which protecting the data is desired.

Personal data, as described herein, refers to any information relating to an identified or identifiable natural person. An identifiable natural person is a person who can be identified, directly or indirectly, in particular by reference to an identifier such as a name, an identification number location data or an online identifier. Personal data which has undergone encryption, anonymization and/or pseudonymization can still be related or derived to identify a natural person. For example, indirect identification could occur from the use of additional information such as a name, internet protocol (IP) address, location data, traffic pattern analysis, time pattern analysis, etc. Even if the data is confidential, the communication pattern, e.g., location, time, packet burst, frequency, etc., may jeopardize privacy.

Some current solutions exist to address data privacy issues in communication systems. One current solution is provided by The Onion Router (TOR). The TOR network is a group of volunteer operated servers that allow people to improve their privacy and security when using the Internet. TOR's users employ the TOR network by connecting through a series of virtual tunnels instead of making a direct connection. This allows both organizations and individuals to share information over public networks without compromising their privacy. This also enables the TOR network to be an effective censorship circumvention tool, allowing its users to reach otherwise blocked destinations or content. TOR can also be used as a building block for software developers to create new communication tools with built-in privacy features. TOR is a service that connects users anonymously to the Internet through a network of randomly selected nodes or relays, which are encrypted at each node. Because the route that the data travels in the TOR network is never entirely visible, the trail is allegedly, always masked.

Another current solution is the Vuvuzela network, which is a system for scaling private messaging to millions of users operating at tens of thousands of messages per second, while protecting against traffic analysis by a powerful adversary who can compromise all but one of the system's servers. Vuvuzela achieves this by using a protocol which is designed to identify and minimize the number of observable variables in the system. Also, Vuvuzela's protocol hides these variables by using noise with quantifiable security properties and by using leveraging tools from differential privacy, e.g., using special algorithms. Together, these techniques allow for Vuvuzela to achieve private messaging at a scale orders of magnitude higher than prior systems. Additionally, in Vuvuzela there is an ability to generate cover traffic to hide the real traffic so that it is more difficult to identify the original user. With the cover traffic solution, there are more fake users which can hide the original user so that both the original user's identification and data privacy are better protected.

Both TOR and Vuvuzela hide communications under a chain of participating servers to protect and relay the message, as well as, in some cases, adding complex cover traffic. However, this protection comes at the price of introducing long latency times for the end-to-end message delivery. Additionally, a user can only start a new communication round every so often, e.g., ten minutes, and as such the user is also limited in quantity and time period for making requests.

Thus, there is a need to provide methods and systems that overcome the above-described drawbacks associated with transmitting data while maintaining privacy in communication systems.

SUMMARY

Embodiments described herein provide for data protection and data privacy by using processing elements which temporarily store data for forwarding between two servers. The processing elements, including their associated data and metadata, are erased (or destroyed/deleted) after completion of their forwarding task. With the exception of the two servers, all other nodes, servers, communication devices and enterprise devices are a part of a protected proxy network. This allows for both increased security and a reduction in latency in communications.

According to an embodiment, there is a method for maintaining data privacy in a communication system, the method includes: providing a proxy network which creates a plurality of ingress processing elements and a plurality of egress processing elements, wherein the ingress processing elements and the egress processing elements each include at least a private processing unit and a private memory area; receiving a request at a selected ingress processing element from a first server; routing the request from the selected ingress processing element to a selected egress processing element; forwarding the request from the selected egress processing element to a second server; and erasing both the selected ingress processing element and the selected egress processing element.

According to an embodiment, there is a system for maintaining data privacy in a communication system, the system includes: a proxy network which creates a plurality of ingress processing elements and a plurality of egress processing elements, wherein the ingress processing elements and the egress processing elements each include at least a private processing unit and a private memory area; the proxy server receiving a request at a selected ingress processing element from a first server; the proxy server routing the request from the selected ingress processing element to a selected egress processing element; and the proxy server forwarding the request from the selected egress processing element to a second server, wherein both the selected ingress processing element and the selected egress processing element are erased.

According to an embodiment, there is a computer-readable storage medium containing a computer-readable code that when read by a processor causes the processor to perform a method for maintaining data privacy in a communication system, the method includes: providing a proxy network which creates a plurality of ingress processing elements and a plurality of egress processing elements, wherein the ingress processing elements and the egress processing elements each include at least a private processing unit and a private memory area; receiving a request at a selected ingress processing element from a first server; routing the request from the selected ingress processing element to a selected egress processing element; forwarding the request from the selected egress processing element to a second server; and erasing both the selected ingress processing element and the selected egress processing element.

According to an embodiment, there is an apparatus adapted to create a plurality of ingress processing elements and a plurality of egress processing elements, wherein the ingress processing elements and the egress processing elements each include at least a private processing unit and a private memory area; receive a request at a selected ingress processing element from a first server; route the request from the selected ingress processing element to a selected egress processing element; forward the request from the selected egress processing element to a second server; and erase both the selected ingress processing element and the selected egress processing element.

According to an embodiment, there is an apparatus including: a first module configured to create a plurality of ingress processing elements and a plurality of egress processing elements, wherein the ingress processing elements and the egress processing elements each include at least a private processing unit and a private memory area; a second module configured to receive a request at a selected ingress processing element from a first server; a third module configured to route the request from the selected ingress processing element to a selected egress processing element; a fourth module configured to forward the request from the selected egress processing element to a second server; and a fifth module configured to erase both the selected ingress processing element and the selected egress processing element.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As described in the Background section, there are problems associated with current methods for maintaining data privacy. Embodiments described herein provide for a proxy network which includes one or more communication nodes such as a proxy server, e.g., a General Data Protection Regulation (GDPR) server, which generates and uses self-erasing processing elements, e.g., containers, in support of maintaining data privacy. These self-erasing processing elements can have an image, an operating system, applications, data or some subset of these elements. Embodiments also provide for allowing one or more data request and response traffic flows with a low latency of end-to-end communications to travel only through the proxy network between the nodes which desire to exchange data. Additionally, using cover traffic or additional noise are not required.

Figure 1:
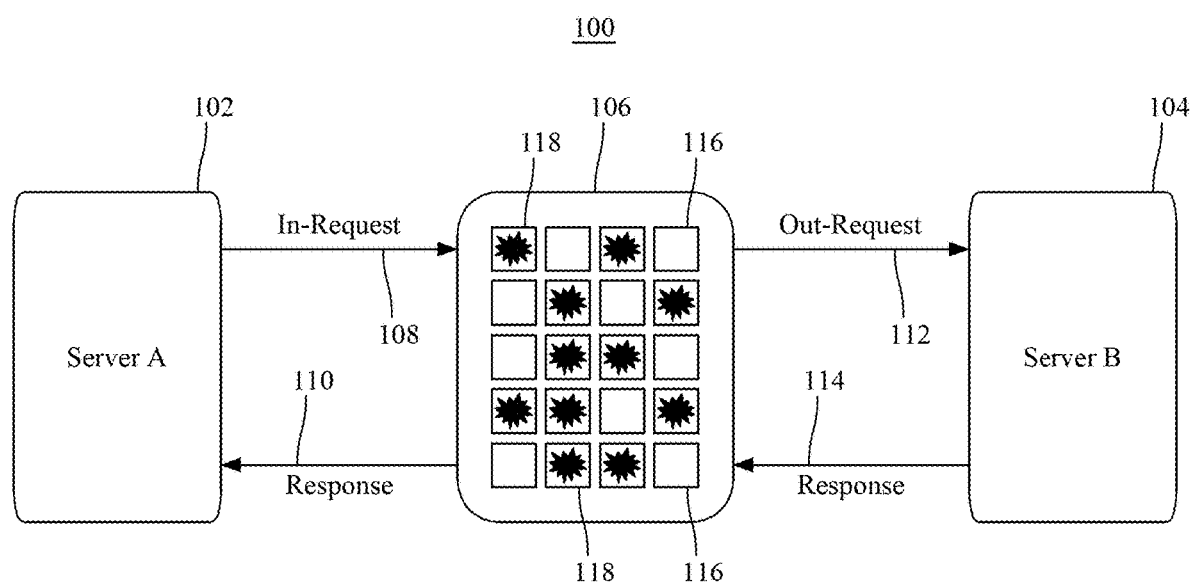
FIG. 1 shows a proxy network supporting communications between two servers according to an embodiment.

These concepts will now be discussed with respect to FIG. 1. According to an embodiment, FIG. 1 shows a system 100 which includes two servers, server A 102 and server B 104, which are in communication with each other via a proxy network 106. In FIG. 1, the direct communication between Server A 102 and Server B 104 occurs by using two secure communication channels and a proxy network 106. The first secure communication channel is shown by the In-Request arrow 108 and the Response arrow 110 between server A 102 and the proxy network 106. The second secure communication channel is shown by the Out-Request arrow 112 and the Response arrow 114.

In operation, the communication between server A 102 and server B 104 goes through the proxy network 106. No other nodes are typically involved in these communications. When server A 102 makes a request, via the proxy network 106, an ingress processing element, also referred to herein as an ingress container, receives and routes the request to a target egress processing element, also known as an egress container. The egress container then sends the request to server B 104. The response is generated by server B 104, sent to the proxy network 106 and forwarded back to server A 102. At the proxy network 106, the processing element procedure is performed in reverse order as performed during the request process.

Additionally, the response received at the proxy network 106 can also be processed using, for example, General Data Protection Regulation (GDPR) policy. The interested reader can find more details about GDPR policy at, for example, https://en.wikipedia.or/wiki/General_Data_Protection_Regulation. Upon completion of the response and request process, all of the processing elements that were involved at the proxy network 106 self-destruct, i.e., are erased. Also, shown in the proxy network 106 are a plurality of processing elements 116 representing both ingress processing elements and egress processing elements as well as a plurality of erased processing elements 118 representing erased ingress and egress processing elements. According to an embodiment, the processing elements can include a private processing unit, with the processing unit being an electronic circuitry entity that carries out instructions of a computer program by performing the basic arithmetic, logical, control and input/output (I/O) operations specified by the instructions, and an associated private memory area which can store information associated with communication nodes and devices and/or enterprise network nodes and devices. The process of self-destructing processing elements can also be considered the process of deleting all data and metadata associated the processing elements at some point in time, typically five seconds or less, after completion of the request/response message flow.

According to an embodiment, an example of a container which can be used to implement a self-erasing processing element is described below using pseudo-code. Note, in particular, the time-to-live container parameter which establishes a trigger for erasure of the container as described below.

containers:
name: db
image: mysql
ttl: 5s (time-to-live=self-destruct timer)
env:
   name: MYSQL_ROOT_PASSWORD
   value: "password"
resources:
   requests:
     memory: "64 Mi"
     cpu: "250m"
   limits:
     memory: "128 Mi"
     cpu: "500m"
name: wp
image: wordpress
ttl: 5s (time-to-live=self-destruct timer)
resources:
   requests:
     memory: "64 Mi"
     cpu: "250m"
   limits:
     memory: "128 Mi"
     cpu: "500m"

Figure 2:
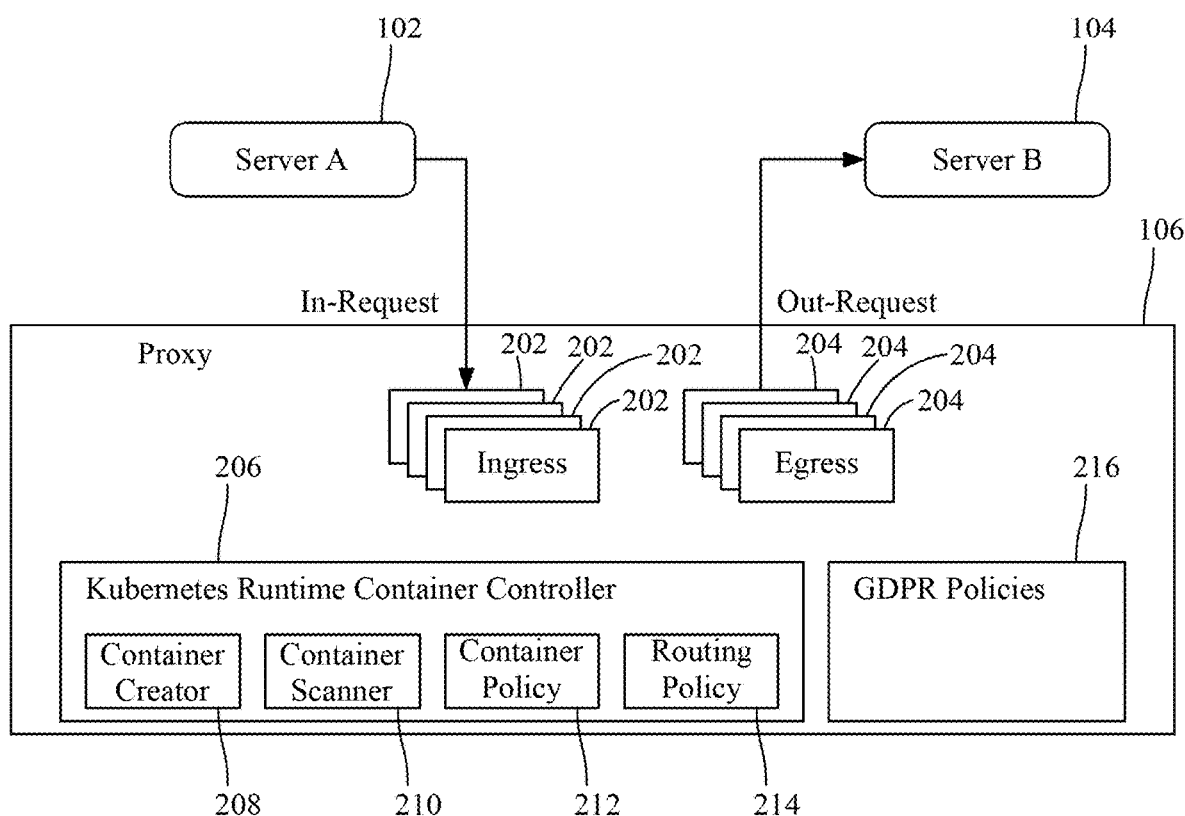
FIG. 2 depicts the proxy network according to an embodiment.

According to an embodiment, an exemplary proxy network 106 is shown in FIG. 2. The proxy network 106 can generate a plurality of ingress processing elements 202 and a plurality of egress processing elements 204, e.g., containers similar to that described above, which can be executed on a Kubernetes cluster, or other similar processes, e.g., Docker Swarm, Redhat Openshift, etc. Kubernetes is an open source system which can be used for automating operations associated with the processing elements described herein. The proxy network 106 also includes a Kubernetes runtime container controller 206, which can be a processor or processors, and is operated/controlled by a trusted source to support data privacy.

According to an embodiment, the Kubernetes runtime container controller 206 includes several functions, also known as modules, such as a container creator function 208, a container scanner function 210, a container policy function 212 and a routing policy function 214. The container creator function 208 is responsible for creating processing elements which have a self-destruction policy. The quantity of processing elements created can be based on the load of requests. Processing elements can be created on different clouds and locations, e.g., Azure Europe, Amazon Web Services (AWS) Asia, Google US, AWS Europe and on-premise data centers, using different operating systems, protocol stack, software stack and programming languages. The routing policy function 214 can include several sub-modules for receiving, routing, and forwarding requests.

The container scanner function 210 repeatedly checks a hash code of each processing element image and compares the checked hash code with an initial hash of the initial processing element image. An image is an inert, immutable, file that's essentially a snapshot of a container, i.e., an instance of an image is a container. When an image is executed, the result is a running container of this image. There can be many running containers of the same image. Each image has the following attributes: (1) TAG, which is used to logically tag images; (2) Image ID, which is used to uniquely identify the image; (3) Created; which is the number of days since the image was created; and (4) Virtual Size, which is the size of the image. An example of pseudo-code associated with an image is shown below.

$ docker images
REPOSITORY TAG
IMAGE ID CREATED
VIRTUAL SIZE
busybox latest
c51f86028340 4 weeks ago
1.109 MB When the comparison of the hash codes is determined to not be a match, which is considered to be a failed comparison, the Kubernetes runtime container controller 206 can instruct the processing element associated with the failed image comparison to self-destruct. The failed hash comparison check can be an indication of tampering occurring with the processing element. Additionally, according to an embodiment, prior to self-destructing, the processing element can transfer its contents to another processing element. Additionally, according to an embodiment, a soft-handover between processing elements can occur for transferring information prior to erasure of designated processing elements for other use cases in addition to a failed hash comparison.

The container policy function 212 defines the processing element self-destruction policy, e.g., a policy based on a short timer, a policy based after one or more complete request/response flows between the two servers 102 and 104 or an adhoc policy based on processor element image active scanning. A non-limiting example of the short timer could be 1 second or 5 seconds, however, other amounts of time could also be used as desired.

The routing policy function 214 defines the routing policy for which ingress processing element 202 is selected to receive a request and which target egress processing element 204 that the ingress processing element 202 is going to route the message to. Examples of some routing policies which can be used include, but are not limited to, one or more of a random policy, a load-balance policy, a regulation-based policy, an identity-based policy (clear or anonymized) and an on-demand policy.

One or more routing policies can be used to select an egress processing element 204 to receive a particular request. For example, if a certain country's regulations require that a server request be issued by a processing element within the same country as the server B 104 resides, i.e., a regulation policy, then the routing policy function 214 can, as an initial step in selecting an egress processing element 204, select an egress processing element 204 which is physically located in the same country as server B 104.

Alternatively, if there are a group of egress processing elements 204 which physically reside in the requisite country, then one of those egress processing elements 204 can be selected based on, e.g., another routing policy. For example, given a set of egress processing elements 204 that satisfy a regulation policy, one of those egressing policy elements 204 can be selected based on a second, different routing policy. As an example, a load-balancing routing policy could be used by routing policy function 214 whereby one of the egress processing elements 204 that satisfies the regulation policy is selected because it has fewer queued requests than other eligible egress processing elements 204, i.e., those in the subset created by the regulation policy.

According to an embodiment, for an identity-based policy, if a request has specified an identity, e.g., a car identity, that car identity can be used to determine which Server B shall be the host for the identity (according to public available identity database), e.g., if it is a Volvo Car registration ID, the ID will be then mapped to a subscriber ID. Then the request will be routed (based on the car ID and subscriber ID) to a Volvo subscriber management platform that is running with a specific MNO and in a specific country. After determining which Server B should be receiving the request, then based on Server B location the egress container can be selected.

According to an embodiment, for the on-demand policy, it should be first for "on-demand" to create the proper number of processing elements based on the number of requests, and then perform a "random" selection of one ingress and one egress processing element per request.

Additionally, according to an embodiment, the proxy network 106 can include a function 216 associated with implementing and enforcing or representing policies associated with GDPR. For example, "self-erasing processing elements" comply with GDPR privacy protection policy in terms of data processing and data storage rules, because after data processing and communications are completed, data processor/memory/storage and the processing element itself will be erased so that the process complies with GDPR privacy protection terms. The proxy network 106 can include one or more proxy servers to implement functions as shown in the proxy network 106. These functions could be divided up such that one proxy server could perform the ingress functions and another proxy server could perform the egress functions. Additionally, according to another embodiment, the functions associated with ingress could be performed by server A 102 and the egress functions could be performed by server B 104 or by proxies associated with server A 102 and server B 104.

Figure 3:
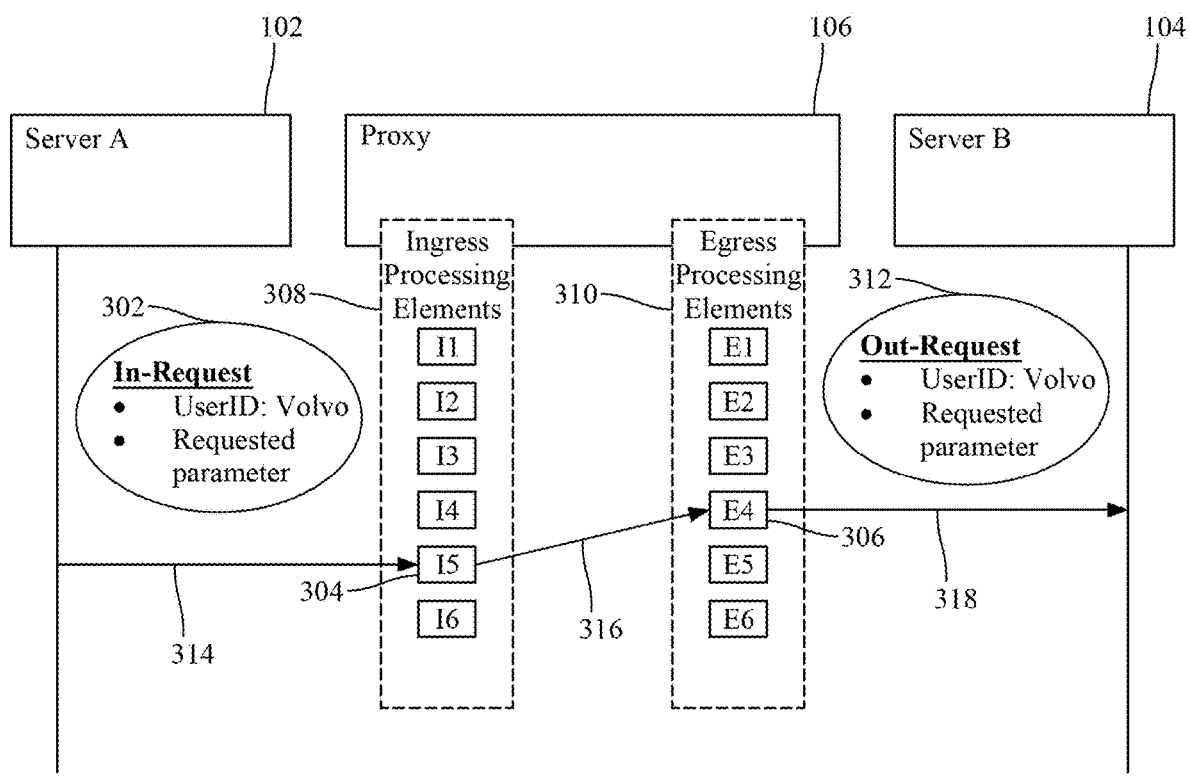
FIG. 3 shows a request traffic flow according to an embodiment.

According to an embodiment, FIG. 3 shows an example of a flow associated with a request. Initially, server A 102 generates the request, shown as In-Request 302, which has a UserID of Volvo and a request parameter. The In-Request 302 is transmitted to the proxy network 106, as shown by arrow 314, which selects a random routing policy for determining that ingress processing element I5 304 of the ingress processing elements 308 will receive the request. Ingress processing element I5 304 routes the request(s), as shown by arrow 316, to a target egress processing element E4 306 which was selected from the plurality of random egress processing elements 310. The routing from the ingress processing element I5 304 to the target egress processing element E4 306 can also be selected from one of the routing policies described above. For this example, only specifically located egress processing elements, e.g., egress processing element E4 306 located in Azure China, are allowed to deliver requests, and receive responses, to server B 104 based on the specific country server B 104 is located. This routing from egress processing element E4 306 to server B 104 is shown in Out-Request 312 and arrow 318.

Figure 4:
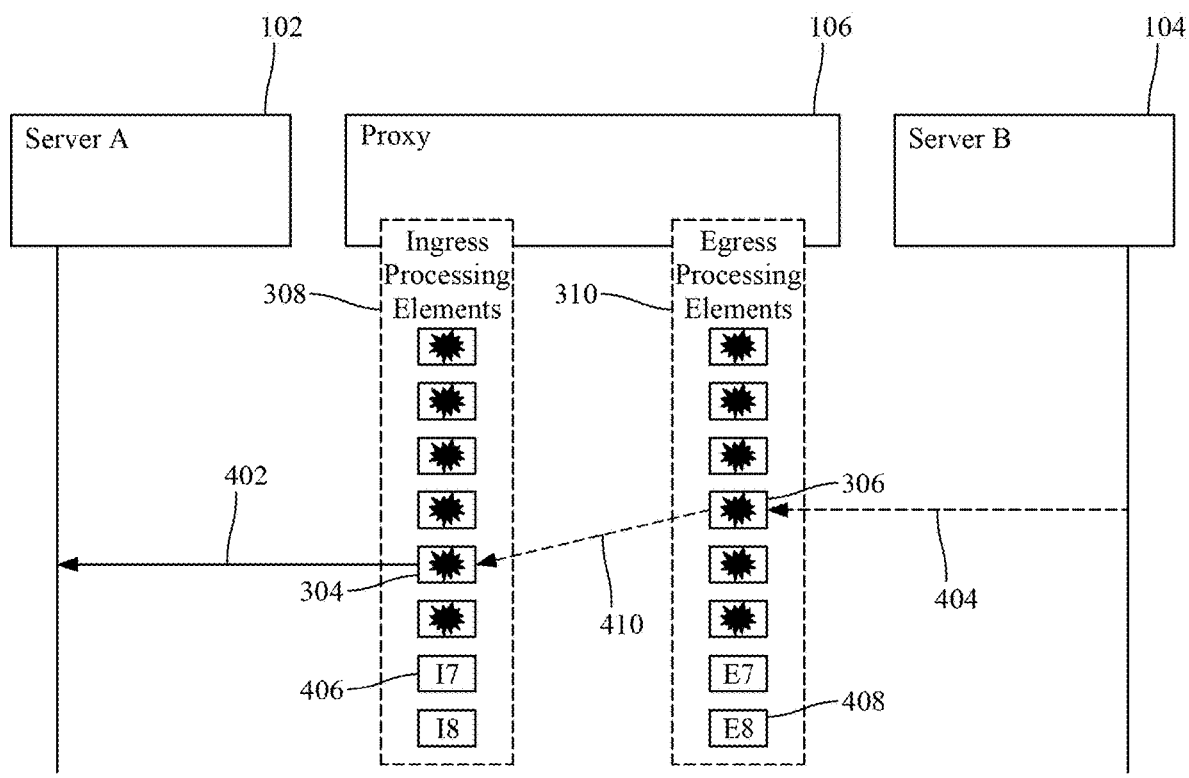
FIG. 4 depicts a response traffic flow according to an embodiment.

According to an embodiment, FIG. 4 shows an example of a flow associated with a response to a request. After processing the request, Server B 104 generates a response message. The response, which can include one or more response parameters, is transmitted from Server B 104 to processing element E4 306 in the grouping of egress processing elements 310 as shown by arrow 404. For example, one response parameter can be associated with a "Get Device Info" request as shown below: GET Response:

"id": "89001012012341234012345678901224",
"type": "euicc",
"tags":
[
"country: denmark",
"model: 50001"],
"subscription":
{
"status": "active",
"servicepolicy":
{ },
"profile":
{ }}

Processing element E4 306 then performs data processing according to GDPR policies, e.g., encryption, anonymization and pseudonymization, and the processing element E4 306 then forwards the response to processing element 16 304 located in the group of ingress processing elements 308 as shown by arrow 410. Processing element I5 304 then forwards the response to Server A 102 as shown by arrow 402. After the completion of the request-response flow, e.g., usually <1 second after, or upon completion of a self-destruct time, e.g., five seconds, all of the processing elements that were involved in the communication flow are self-destructed, i.e., erased or deleted. Self-destructed processing elements are shown in FIG. 4 by including a "*" within the processing element, for example, see egress processing element E4 306 in which the "E4" is replaced by a "*". Currently available, non-erased processing elements can be seen also in FIG. 4, see, e.g., ingress processing element 17 406 and egress processing element E8 408.

Figure 5:
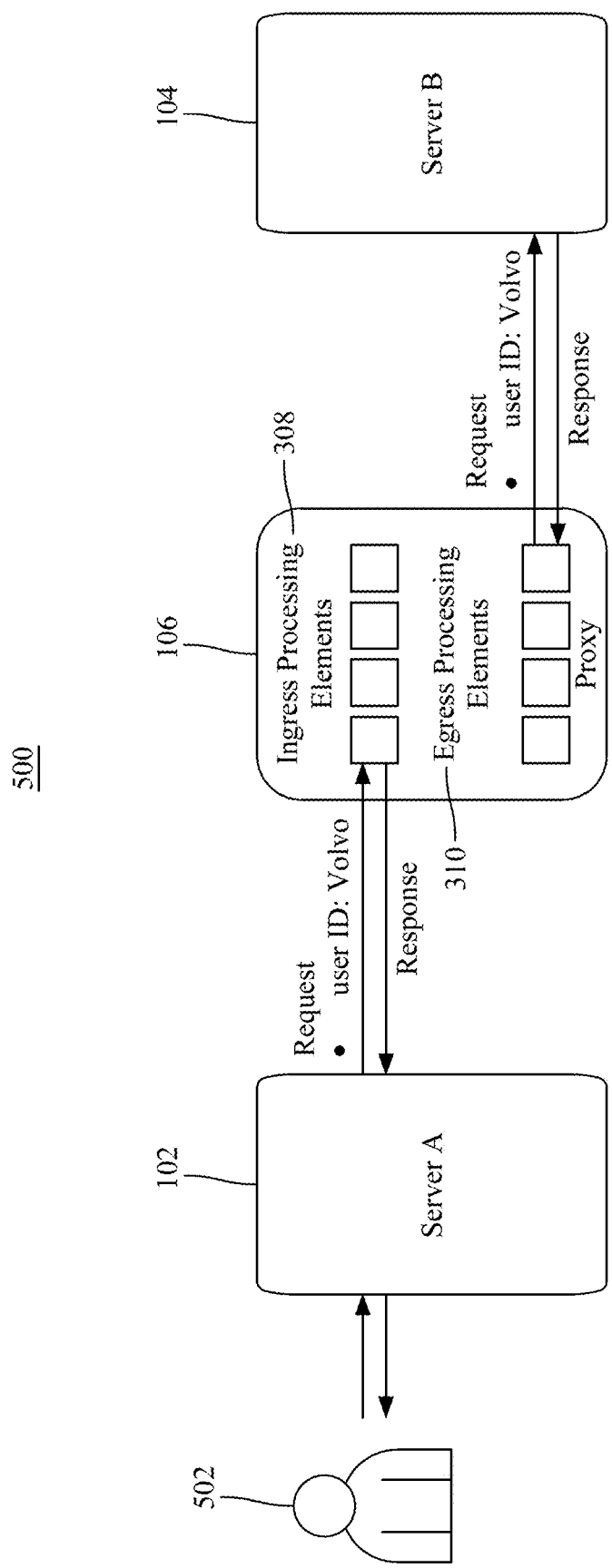
FIG. 5 shows a first use case according to an embodiment.

According to an embodiment, FIG. 5 shows a use case between server A 102 and server B 104. In this example, the system 500 shows a customer, e.g., Volvo® 502, desiring to use a product named Universal Connectivity Management (UCM) which is implemented on server A 102. User Volvo® 502 wants to manage connectivity from the UCM, as a single interface, for their connected cars globally. Volvo® manufactured cars are connected to many different mobile network operators (MNOs) who are using different Internet of Things (IoT) platforms, e.g., some Volvo® cars are connected to a Telenor network on an Ericsson® Device Connection Platform (DCP) and other Volvo® cars are connected to AT&T® via a Cisco® Jasper Platform and yet other Volvo® cars are connected to China Mobile® on a China Mobile® IoT platform. However, according to an embodiment, user Volvo 502 can use the UCM on server A 102 as a single interface to interact with all of the MNOs and all IoT platforms, one of which is represented by server B 104. Server B 104 in this example represents a Cisco® Jasper Platform.

When the UCM operating on server A 102 is making a call to server B 104 on behalf of user Volvo® 502, the UCM will use a Volvo® userID to login to server B 104. However, due to data protection, privacy, regulations, security and possibly other issues related to GDPR, server A 102 and server B are not directly exposed to each other and do not communicate directly. Instead, there is the proxy network 106 located between server A 102 and server B 104. As can be seen in this use case, request and response communication flows operate as shown in, for example, FIGS. 3 and 4 using the proxy network 106 and the ingress processing elements 308 and the egress processing elements 310. Upon completion of the request/response message flow, the used processing elements are self-destructed.

Figure 6:
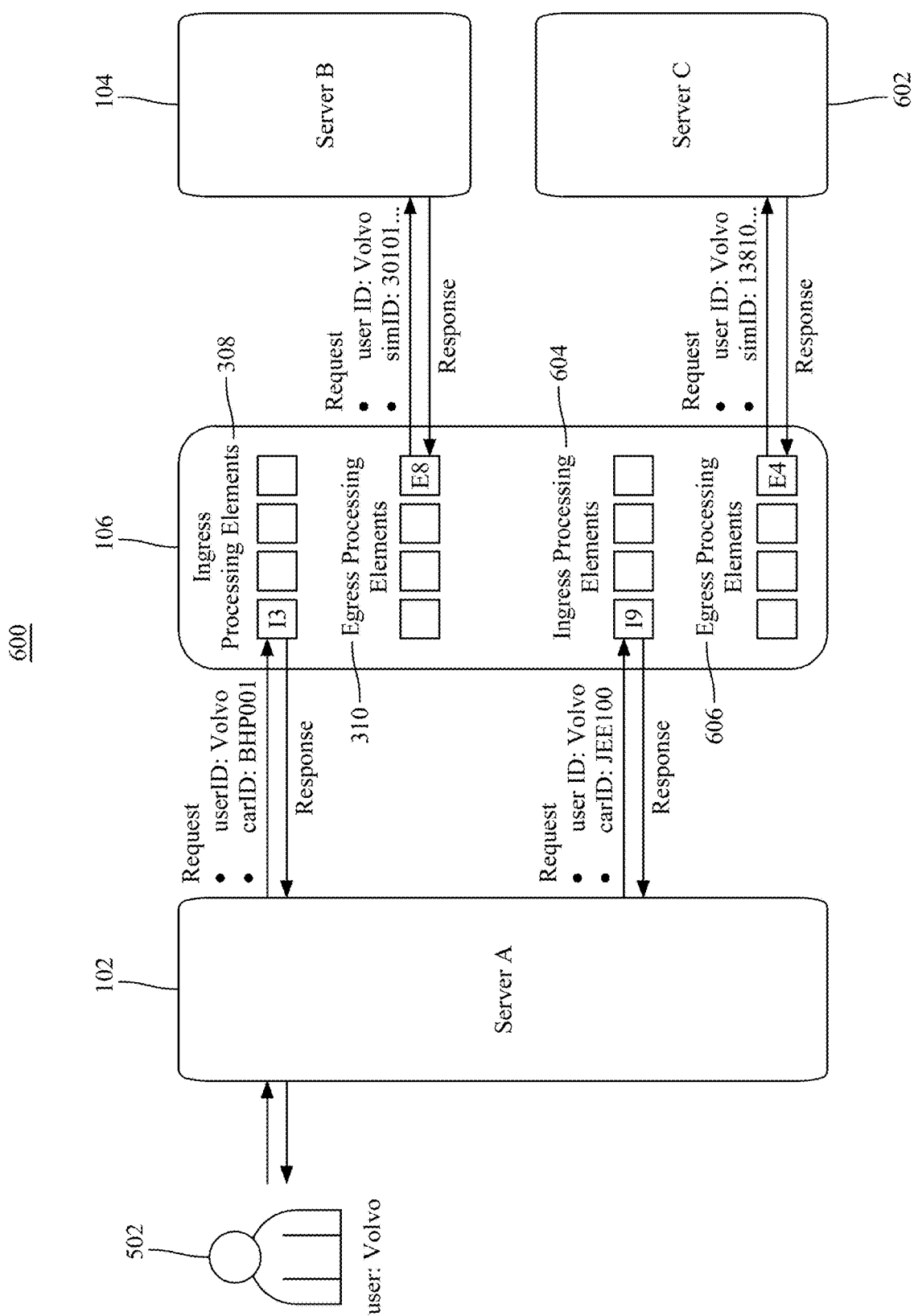
FIG. 6 shows a second use case according to an embodiment.

According to an embodiment, FIG. 6 shows a use case for user Volvo® 502 with the UCM operating on server A 102 and communicating with both server B 104 and server C. FIG. 6 shows similar components and request/response message flows to those shown in FIGS. 3-5. Additionally, FIG. 6 includes additional ingress processing elements 604 and additional egress processing elements 606 which are used for communications initiated by user Volvo® 502 as generated by the UCM operating on server A 102 which are to end at server C 602, which for this example, represents a China Mobile® IoT platform. Upon completion of the request/response message flow, the used processing elements are self-destructed.

Embodiments described herein can use strong security mechanisms and encryptions to protect processing elements and to protect access to the processing elements. Strong encryptions can be used to encrypt a data link between ingress processing elements 202 and egress processing elements 204, e.g., using double encryption with Advanced Encryption Standard (AES) 256 for the message and Rivast-Shamir-Adleman (RSA) 1024 for keys for the processing elements. Other factors can also be implemented to further enhance security such as, for example, having processing elements operating on different clouds by using, for example, Kubernetes federation services, operating in different regions or countries, having the processing elements operate on different operating systems, using different communication protocols and using different programming languages. Non-limiting examples of different operating systems include Linux and Windows. Non-limiting examples of different communication protocols include Hypertext Transfer Protocol (http), Constrained Application Protocol (CoAP) and Message Queueing Telemetry Transport (MQTT). While non-limiting examples of different programming languages which can be used include Java, Golan, C and Java Script (JS).

Figure 7:
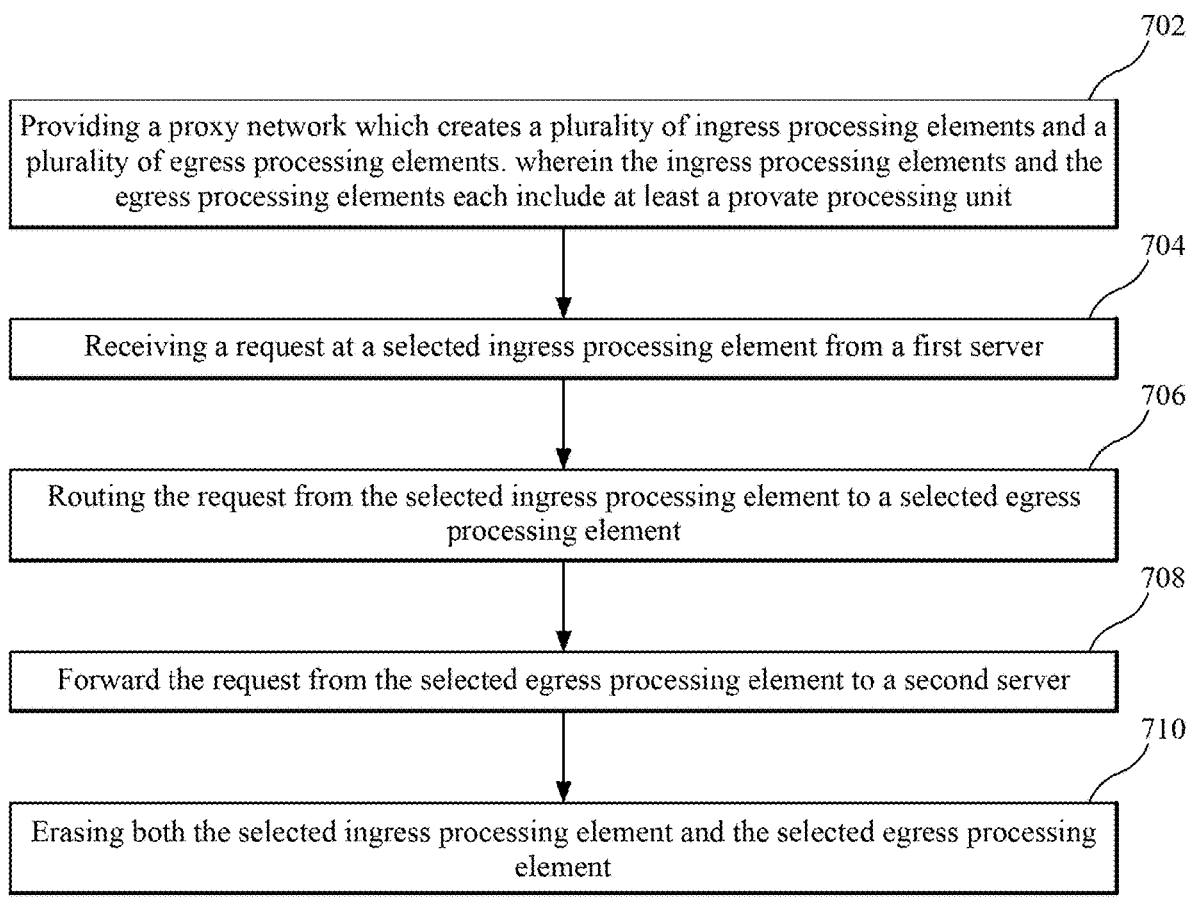
FIG. 7 shows a flowchart of a method for maintaining data privacy according to an embodiment.
Figure 8:
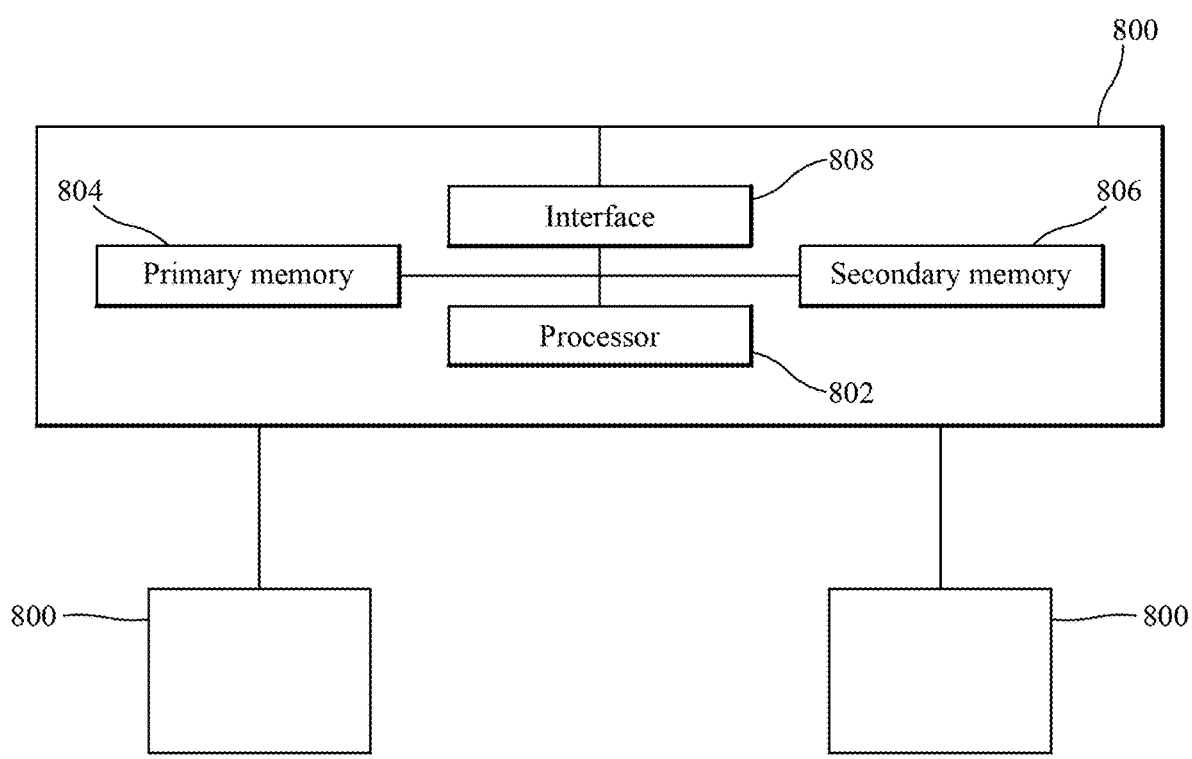
FIG. 8 depicts a plurality of communication node located in the proxy network according to an embodiment.

In addition to being characterized as systems, embodiments can also be characterized as methods. According to an embodiment there is a method for maintaining data privacy in a communication system as shown in FIG. 7. The method includes: in step 702, providing a proxy network which creates a plurality of ingress processing elements and a plurality of egress processing elements, wherein the ingress processing elements and the egress processing elements each include at least a private processing unit; in step 704, receiving a request at a selected ingress processing element from a first server; in step 706, routing the request from the selected ingress processing element to a selected egress processing element; in step 708, forwarding the request from the selected egress processing element to a second server; and in step 710, erasing both the selected ingress processing element and the selected egress processing element Embodiments described above can be implemented using communication nodes (which includes communication devices, servers, enterprise devices, etc.) which are a part of the proxy network 106. An example of such communication nodes 800 are illustrated as part of the proxy network as shown in FIG. 8. The communication node 800 includes at least one processor 802 for executing instructions and performing the functions described herein, e.g., the functions associated with the Kubernetes runtime container controller 206. The communication node 800 also includes a primary memory 804, e.g., RAM memory, a secondary memory 806 which is a non-volatile memory, and an interface 808 for communicating with other portions of communication networks, e.g., server A 102 and server B 104. The communication node 800 can act as a proxy server or other device located within proxy network 106 which maintains data privacy and supports the embodiments described herein. Communication node 800 can also represent server A 102, server B 104 or any device a user, e.g., user Volvo 502, could use to communicate with server A 102.

Processor 802 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other communication node 800 components, such as memory 804 and/or 806, communication node 800 functionality. For example, processor 802 may execute instructions stored in memory 804 and/or 806.

Primary memory 804 and secondary memory 806 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Primary memory 804 and secondary memory 806 may store any suitable instructions, data or information, including software and encoded logic, utilized by network node 800. Primary memory 804 and secondary memory 806 may be used to store any calculations made by processor 802 and/or any data received via interface 808.

Communication node 800 also comprises interface 808 which may be used in the wired or wireless communication of signaling and/or data associated with the proxy network 106. For example, interface 808 may perform any formatting, coding, or translating that may be needed to allow communication node 800 to send and receive data over a wired connection. Interface 808 may also include a radio transmitter and/or receiver that may be coupled to or a part of the antenna. The radio may receive digital data that is to be sent out to other network nodes or WDs via a wireless connection. The radio may convert the digital data into a radio signal having the appropriate channel and bandwidth parameters. The radio signal may then be transmitted via an antenna to the appropriate recipient (e.g., server B 104).

Embodiments allow for GDPR data privacy and data protection. A low latency, e.g., less than 1 second, can be achieved when handling an end-to-end request. By way of contrast to the TOR and Vuvuzela methods described in the Background, embodiments described herein do not need to add cover traffic to improve the quality of the data privacy and data protection. Users can make a request at any time and there is no "round" concept used which removes the requirement of making users wait to initiate another request.

Embodiments also allow for strengthened security by erasing or self-destructing all ingress and egress processing elements. This also allows for avoiding remote access Trojans and so-called "zombie" armies (also known as "botnets") by erasing all of the processing elements within a short period of time, e.g., less than 5 seconds. Additionally, this self-destruction system uses a simpler infrastructure when compared to systems that implement "hide in the crowd" features.

It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

Figure 9:
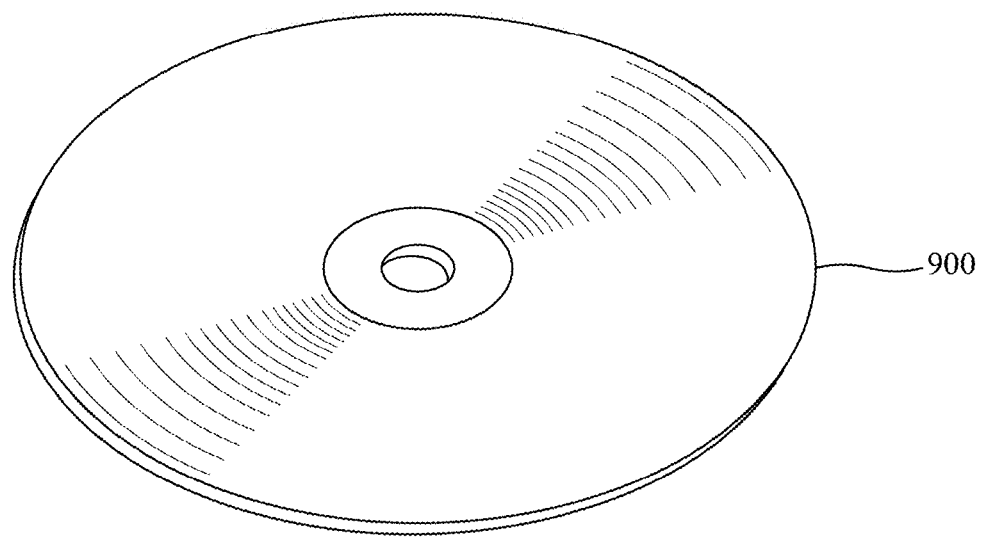
FIG. 9 depicts an electronic storage medium on which computer program embodiments can be stored.

As also will be appreciated by one skilled in the art, the embodiments may take the form of an entirely hardware embodiment or an embodiment combining hardware and software aspects. Further, the embodiments, may take the form of a computer program product stored on a computer-readable storage medium having computer-readable instructions embodied in the medium. For example, FIG. 9 depicts an electronic storage medium 900 on which computer program embodiments can be stored. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method for maintaining data privacy in a communication system, the method comprising:
   creating, by a proxy network, a plurality of ingress processing elements and a plurality of egress processing elements, wherein the ingress processing elements and the egress processing elements each include at least a private processing unit and a private memory area;
   receiving a request at a selected ingress processing element from a first server;
   routing the request from the selected ingress processing element to a selected egress processing element;
   forwarding the request from the selected egress processing element to a second server;
   receiving, from the second server, at the selected egress processing element, a response to the request;
   forwarding the response from the selected egress processing element to the selected ingress processing element;
   forwarding the response from the selected ingress processing element to the first server; and
   based on forwarding the response to the first server, erasing both the selected ingress processing element and the selected egress processing element.

2. The method of claim 1, wherein prior to the step of erasing, the method further comprises:
   generating the response at the second server based on the request; and
   forwarding the response from the second server to the selected egress processing element.

3. The method of claim 1, wherein said erasing comprises:
   upon forwarding the response to the first server, starting a timer; and
   when a predetermined duration of time is reached by the timer, erasing both the selected ingress processing element and the selected egress processing element.

4. The method of claim 3, wherein the predetermined duration of time is a duration of five seconds or less.

5. The method of claim 1, wherein erasing the selected ingress processing element and the selected egress processing element includes deleting all data and metadata associated with the selected ingress processing element and deleting all data and metadata associated with the selected egress processing element.

6. The method of claim 1, wherein the selected ingress processing element and the selected egress processing element are selected based on one of a randomizing policy, an anonymized identity, a clear identity, a regulations policy or on demand.

7. The method of claim 1, wherein the proxy network includes at least one processer configured to operate as a Kubernetes runtime container controller.

8. The method of claim 7, wherein the processor operating as the Kubernetes runtime container controller performs the steps of:
   generating, by a container creator function, the plurality of ingress processing elements and the plurality of egress processing elements;
   checking, by a container scanner function, a hash code associated with each ingress processing element image and each egress processing element image and comparing an initial hash with an initial image for each ingress processing element image and each egress processing element image;
   initiating erasure for each ingress processing element and each egress processing element for which the hash comparison fails;
   defining, by a container policy function, an erasure policy to use for each ingress processing element and each egress processing element; and
   selecting, by a routing policy function, the routing policy which determines how each ingress processing element and each egress processing element is selected.

9. The method of claim 8, wherein when erasure is initiated, prior to erasure, contents of the ingress processing element or egress processing element selected for erasure are transferred to another ingress processing element or egress processing element.

10. The method of claim 1, wherein General Data Protection Regulations are applied for data protection and data privacy to data associated with each processing element, which data includes at least one of telecom data and enterprise data.

11. The method of claim 1, wherein said erasing comprises erasing both the selected ingress processing element and the selected egress processing element responsive to forwarding the response from the selected ingress processing element to the first server, wherein forwarding the response from the selected ingress processing element to the first server completes one request and response message flow between the first and second servers.

12. The method of claim 11, wherein the one request and response message flow is the only request and response message flow completed between the first and second servers via the selected ingress processing element and the selected egress processing element since the selected ingress processing element and the selected egress processing element were created, such that the selected ingress processing element and the selected egress processing element are erased after being involved in completion of a single request and response message flow between the first and second servers and before being involved in completion of any other request and response message flow completed between the first and second servers.

13. A proxy network for maintaining data privacy in a communication system, the proxy network comprising:
one or more communication nodes, each comprising processing circuitry and one or more communication interfaces whereby the proxy network is configured to:
create a plurality of ingress processing elements and a plurality of egress processing elements, wherein the ingress processing elements and the egress processing elements each include at least a private processing unit and a private memory area;
receive a request at a selected ingress processing element from a first server;
route the request from the selected ingress processing element to a selected egress processing element;
forward the request from the selected egress processing element to a second server;
receiving, from the second server, at the selected egress processing element, a response to the request;
forward the response from the selected egress processing element to the selected ingress processing element;
forward the response from the selected ingress processing element to the first server; and
based on forwarding the response to the first server, erase both the selected ingress processing element and the selected egress processing element.

14. The system proxy network of claim 13, wherein the proxy network is configured to:
upon forwarding the response to the first server, start a timer; and
when a predetermined duration of time is reached by the timer, erase both the selected ingress processing element and the selected egress processing element.

15. The proxy network of claim 14, wherein the predetermined duration of time is a duration of five seconds or less.

16. The proxy network of claim 13, wherein the proxy network is configured to erase the selected ingress processing element and the selected egress processing element by deleting all data and metadata associated with the selected ingress processing element and deleting all data and metadata associated with the selected egress processing element.

17. The proxy network of claim 13, wherein the proxy network is configured to select the selected ingress processing element and the selected egress processing element for use based on one of a randomizing policy, an anonymized identity, a clear identity, a regulations policy or on demand.

18. The system proxy network of claim 13, wherein the proxy network includes at least one communication node that comprises at least one processer configured to operate as a Kubernetes runtime container controller.

19. The proxy network of claim 18, wherein the Kubernetes runtime container controller comprises:
a container creator function configured to generate the plurality of ingress processing elements and the plurality of egress processing elements;
a container scanner function configured to check a hash code associated with each ingress processing element image and each egress processing element image and comparing an initial hash with an initial image for each ingress processing element image and each egress processing element image;
the Kubernetes runtime container controller configured to initiate erasure for each ingress processing element and each egress processing element for which the hash comparison fails;
a container policy function configured to define an erasure policy to use for each ingress processing element and each egress processing element; and
a routing policy function configured to select a routing policy which determines how each ingress processing element and each egress processing element is selected.

20. The system proxy network of claim 19, wherein when erasure is initiated, prior to erasure, contents of the ingress processing element or egress processing element selected for erasure are transferred to another ingress processing element or egress processing element.

21. The proxy network of claim 13, wherein General Data Protection Regulations are applied for data protection and data privacy, which data includes at least one of telecom data and enterprise data.

22. A non-transitory computer-readable storage medium containing computer-readable code that, when executed by one or more processors in a proxy network, causes the proxy network to:
create a plurality of ingress processing elements and a plurality of egress processing elements, wherein the ingress processing elements and the egress processing elements each include at least a private processing unit and a private memory area;
receive a request at a selected ingress processing element from a first server;
route the request from the selected ingress processing element to a selected egress processing element;
forward the request from the selected egress processing element to a second server;
receive, from the second server, at the selected egress processing element, a response to the request;
forward the response from the selected egress processing element to the selected ingress processing element;
forward the response from the selected ingress processing element to the first server; and
based on forwarding the response to the first server, erase both the selected ingress processing element and the selected egress processing element.

23. A communication node in a proxy network, the communication node comprising:
a communication interface; and
processing circuitry configured to:
create a plurality of ingress processing elements and a plurality of egress processing elements in the proxy network, wherein the ingress processing elements and the egress processing elements each include at least a private processing unit and a private memory area;
select, from among the plurality of ingress processing elements, an ingress processing element to use for a request and response message flow between a first server and a second server;
select, from among the plurality of egress processing elements, an egress processing element to use for the request and response message flow between the first server and the second server;
detect that the request and response message flow between the first server and the second server has been completed using the selected ingress processing element and the selected egress processing element; and based on detecting that the request and response message flow between the first server and the second server has been completed, erase both the selected ingress processing element and the selected egress processing element.

24. The communication node of claim 23, wherein the processing circuitry is configured to:

upon detecting that the request and response message flow between the first server and the second server has been completed, start a timer; and when a predetermined duration of time is reached by the timer, erase both the selected ingress processing element and the selected egress processing element.

* * * * *